(12) United States Patent
Kim

(10) Patent No.: US 9,749,666 B2
(45) Date of Patent: Aug. 29, 2017

(54) DISPLAY APPARATUS

(75) Inventor: Dong Woo Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 440 days.

(21) Appl. No.: 13/204,765

(22) Filed: Aug. 8, 2011

(65) Prior Publication Data

US 2012/0174154 A1    Jul. 5, 2012

(30) Foreign Application Priority Data

Dec. 31, 2010  (KR) .................. 10-2010-0140020
Dec. 31, 2010  (KR) .................. 10-2010-0140021
Jan. 12, 2011  (KR) .................. 10-2011-0003224

(51) Int. Cl.

| | | |
|---|---|---|
| H04N 21/235 | (2011.01) | |
| H04N 21/236 | (2011.01) | |
| H04N 21/2362 | (2011.01) | |
| H04N 21/2365 | (2011.01) | |
| H04N 21/2385 | (2011.01) | |
| H04N 21/43 | (2011.01) | |
| H04N 21/435 | (2011.01) | |
| H04N 21/434 | (2011.01) | |
| H04N 5/38 | (2006.01) | |
| H04N 5/40 | (2006.01) | |
| H04N 5/44 | (2011.01) | |
| H04N 21/41 | (2011.01) | |
| H04N 21/426 | (2011.01) | |

(52) U.S. Cl.
CPC ............. H04N 21/236 (2013.01); H04N 5/38 (2013.01); H04N 5/40 (2013.01); H04N 5/44 (2013.01); H04N 21/235 (2013.01); H04N 21/2362 (2013.01); H04N 21/2365 (2013.01); H04N 21/2385 (2013.01); H04N 21/23614 (2013.01); H04N 21/4122 (2013.01); H04N 21/4263 (2013.01); H04N 21/42607 (2013.01); H04N 21/43 (2013.01); H04N 21/4348 (2013.01)

(58) Field of Classification Search
None
See application file for complete search history.

(56) References Cited

U.S. PATENT DOCUMENTS

| | | | |
|---|---|---|---|
| 6,112,053 A * | 8/2000 | Dunki-Jacobs et al. | ......... 725/17 |
| 8,352,979 B2 * | 1/2013 | Medford | ................. H04N 7/52 |
| | | | 725/110 |
| 8,707,376 B1 * | 4/2014 | Hannum | ................ H04N 7/173 |
| | | | 386/324 |
| 2001/0016949 A1 * | 8/2001 | Lee | ............................... 725/111 |
| 2002/0076023 A1 * | 6/2002 | Kim | ........................ 379/142.04 |

(Continued)

FOREIGN PATENT DOCUMENTS

EP    1158782 A2    11/2001

OTHER PUBLICATIONS

European Search Report for European Application No. 11 189 140.4 which corresponds to the above-identified U.S. application.

*Primary Examiner* — Ricky Chin
(74) *Attorney, Agent, or Firm* — LRK Patent Law Firm

(57) ABSTRACT

A display apparatus is provided, which includes a display panel, and a display driving apparatus mounted on the display panel and driving the display panel, which includes an RF modem having a first tuner for providing a broadcasting signal to the display panel.

16 Claims, 27 Drawing Sheets

(56) References Cited

U.S. PATENT DOCUMENTS

| | | | |
|---|---|---|---|
| 2003/0156228 A1* | 8/2003 | Lee | H04N 5/40 348/724 |
| 2004/0237108 A1* | 11/2004 | Drazin et al. | 725/56 |
| 2006/0066755 A1* | 3/2006 | Kowald | H04N 21/4312 348/581 |
| 2006/0193604 A1* | 8/2006 | Hoshi | H04N 5/4401 386/291 |
| 2007/0019663 A1* | 1/2007 | Takagi | H04H 60/27 370/437 |
| 2007/0101367 A1* | 5/2007 | Lee | H04N 21/235 725/39 |
| 2007/0140391 A1* | 6/2007 | Pan | H04B 1/0032 375/350 |
| 2007/0200964 A1* | 8/2007 | Lee | 348/838 |
| 2008/0240230 A1 | 10/2008 | Oxman et al. | |
| 2009/0207866 A1* | 8/2009 | Cholas | H04L 12/2801 370/505 |
| 2009/0210912 A1* | 8/2009 | Cholas | H04N 5/4401 725/82 |
| 2010/0079083 A1* | 4/2010 | Seguine | 315/292 |
| 2010/0130152 A1* | 5/2010 | Whikehart | H04B 1/1036 455/226.2 |
| 2010/0199301 A1* | 8/2010 | Hayashi | H04H 20/28 725/32 |
| 2011/0234906 A1* | 9/2011 | Jackson | 348/555 |
| 2013/0010201 A1* | 1/2013 | Kim | H04N 5/44543 348/720 |

\* cited by examiner

DISPLAY APPARATUS

CROSS-REFERENCE TO RELATED APPLICATION

This Nonprovisional application claims priority under 35 U.S.C. §119(a) on Patent Application No. 10-2010-0140020 filed in Korea on Dec. 31, 2010, No. 10-2010-0140021 filed in Korea on Dec. 31, 2010, and No. 10-2011-0003224 filed in Korea on Jan. 12, 2011, the entire contents of which are hereby incorporated by reference.

BACKGROUND OF THE INVENTION

Field of the Invention

The present invention relates to a display apparatus.

Description of the Related Art

Generally, a tuner is an apparatus for receiving terrestrial, cable or satellite broadcasting radio waves and tuning the radio waves to videos and sounds so that users may view or listen to the videos and sounds.

Recently, display apparatuses having a radio frequency (RF) modem connected to the tuner and performing communications with the tuner and a server are introduced.

However, conventional display apparatuses have a problem in that installation cost of cables for connecting the tuner and the RF modem is increased, and as installation space of the cable is increased, interior space of the display apparatus is increased.

Furthermore, since a conventional display apparatus needs an additional RF modem when it connects to at least one of external devices or other tuners, manufacturing cost is increased.

Furthermore, since the conventional display apparatus processes broadcasting information corresponding to a broadcasting signal and EPG information corresponding to an EPG signal using one tuner for each information, manufacturing cost of the tuners is increased, and thus manufacturing cost of the display apparatus is increased.

SUMMARY OF THE INVENTION

Accordingly, an aspect of the present invention is to solve at least the problems and disadvantages of the related art.

The present invention relates to a display apparatus, in which installation cost of cables for connecting a tuner and an RF modem can be reduced, and interior space of the display apparatus can be decreased by reducing installation space of the cable.

The present invention relates to a display apparatus, in which manufacturing cost of RF modems can be reduced since an additional RF modem is not needed.

The present invention relates to a display apparatus, in which since broadcasting information corresponding to a broadcasting signal and EPG information corresponding to an electronic program guide (EPG) signal can be processed using one tuner, manufacturing cost of the tuner can be reduced, and thus manufacturing cost of the display apparatus can be reduced.

In one aspect, there is a display apparatus comprising a display panel and a display driving apparatus mounted on the display panel and driving the display panel, which includes an RF modem having a first tuner for providing a broadcasting signal to the display panel.

It is to be understood that both the foregoing general description and the following detailed description are exemplary and explanatory and are intended to provide further explanation of the invention as claimed.

BRIEF DESCRIPTION OF THE DRAWINGS

The accompany drawings, which are included to provide a further understanding of the invention and are incorporated on and constitute a part of this specification, illustrate embodiments of the invention and together with the description serve to explain the principles of the invention. In the drawings.

DETAILED DESCRIPTION OF THE PREFERRED EMBODIMENT

Preferred embodiments of the present invention will be described in a more detailed manner with reference to the drawings.

First Embodiment

Figure 1:
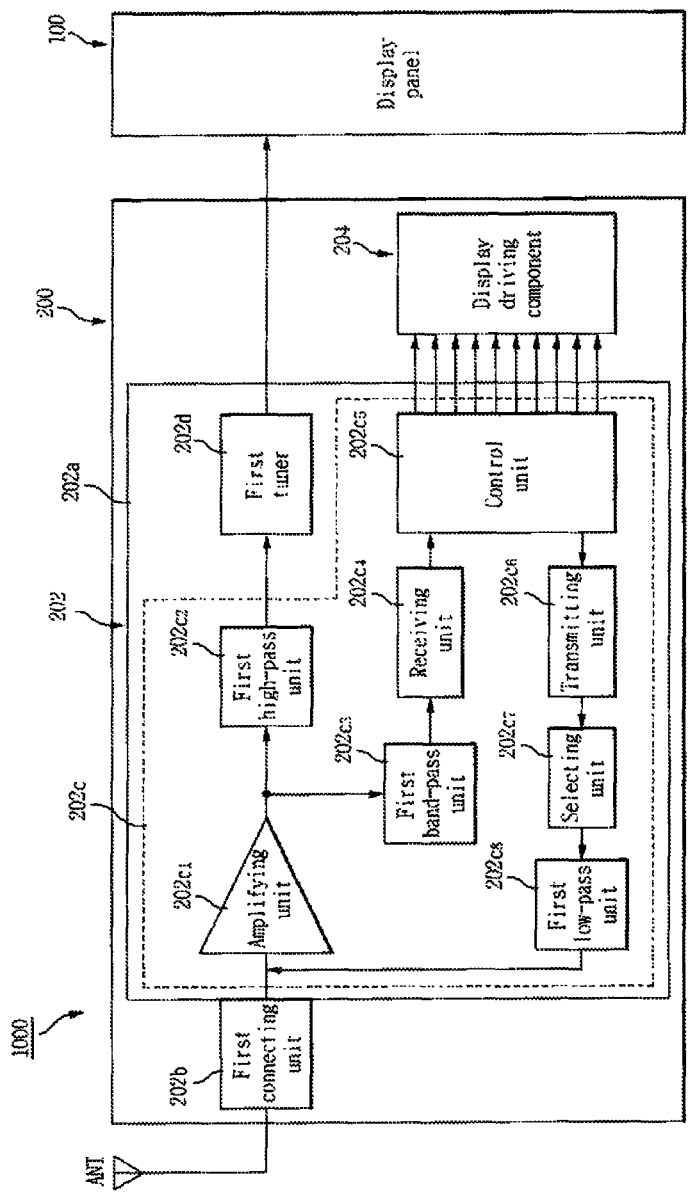
FIG. 1 is a block diagram showing the configuration of a display apparatus according to a first embodiment of the invention.
Figure 2:
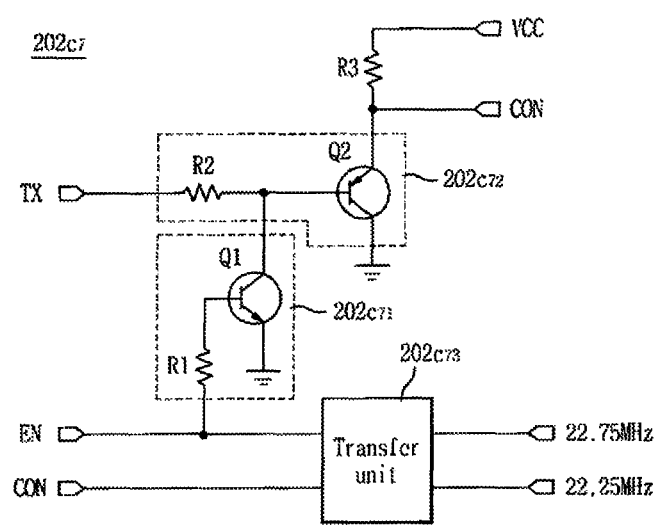
FIG. 2 is a circuit diagram of the selecting unit shown in FIG. 1.

FIG. 1 is a block diagram showing the configuration of a display apparatus according to a first embodiment of the invention, and FIG. 2 is a circuit diagram of the selecting unit shown in FIG. 1.

Referring to FIG. 1, the display apparatus 1000 according to a first embodiment of the invention includes a display panel 100 and a display driving apparatus 200.

At this point, the display driving apparatus 200 is mounted on the display panel 100 and drives the display panel 100. The display driving apparatus 200 includes an RF modem 202 having a first tuner 202d for providing a broadcasting signal to the display panel 100.

Describing in further detail, the RF modem 202 includes a body 202a, a first connecting unit 202b, a frequency signal processing unit 202c, and the first tuner 202d.

The first connecting unit 202b is connected at one side of the body 202a and provides broadcasting signals received from an antenna ANT.

Here, the first connecting unit 202b may have at least either a connecting plug or a connection terminal.

At this point, the body 202a may have a chassis.

The frequency signal processing unit 202c is provided inside the body 202a and electrically connected to a display driving component 204 provided in the display driving apparatus 200. The frequency signal processing unit 202c processes a frequency signal corresponding to the broadcasting signal provided through the first connecting unit 202b and a digital signal provided to the display driving component 204 to control the display driving component 204, in accordance with a previously set frequency band.

Describing in further detail, the frequency signal processing unit 202c includes an amplifying unit 202c1, a first high-pass unit 202c2, a first band-pass unit 202c3, a receiving unit 202c4, a control unit 202c5, a transmitting unit 202c6, a selecting unit 202c7, and a first low-pass unit 202c8.

The amplifying unit 202c1 amplifies the broadcasting signal received from the antenna ANT.

Here, the voltage gain of the amplifying unit 202c1 may be in a range of 3 to 10 dB.

At this point, if the voltage gain of the amplifying unit 202c1 is lower than 3 dB or higher than 10 dB, there is a limit in maintaining efficiency of amplification.

The first high-pass unit 202c2 passes a frequency signal having a frequency higher than a frequency corresponding to the broadcasting signal amplified by the amplifying unit 202c1, and provides the passed frequency signal to the first tuner 202d.)

The first band filter 202c3 passes a frequency signal of a frequency band corresponding to the broadcasting signal amplified by the amplifying unit 202c1.)

The receiving unit 202c4 receives the frequency signal of a frequency band corresponding to the amplified broadcasting signal provided by the first band-pass unit 202c3 in a frequency shift keying (FSK) method.

At this point, the frequency signal of a frequency band corresponding to the amplified broadcasting signal provided by the first band-pass unit 202c3 may be in a range of 49.5 to 50.5 MHz.

Here, the first band-pass unit 202c3 passes a frequency signal having a center frequency of 50 MHz in a bandwidth ranging 1 to 3 MHz among the frequency signal in a frequency band corresponding to the amplified broadcasting signal.

At this point, if the bandwidth of the first band-pass unit 202c3 is lower than 1 MHz, there is a limit in sufficiently passing frequency signals of 49.5 MHz and 50.5 MHz that will be received by the receiving unit 202c4, and if the bandwidth is higher than 3 MHz, there can be a signal interference affected by the broadcasting signal passing the first high-pass unit 202c2.

The control unit 202c5 receives the frequency signal of a frequency band corresponding to the amplified broadcasting signal provided by the receiving unit 202c4 and provides a digital signal to the display driving component 204 to control the display driving component 204.

At this point, the control unit 202c5 can communicate with the display driving component 204 in at least either an inter-IC (IIC) communication method or a universal asynchronous receiver/transmitter (UART) communication method.

The transmitting unit 202c6 controls a driving signal provided by the display driving component 204 under the control of the control unit 202c5 to transmit the frequency signal of a frequency band corresponding to the broadcasting signal in the FSK method.

As shown in FIG. 2, the selecting unit 202c7 selects and transmits a frequency signal among the frequency signal of a frequency band corresponding to the broadcasting signal provided by the transmitting unit 202c6.

Here, the frequency signal of a frequency band corresponding to the broadcasting signal provided by the transmitting unit 202c6 may be in a range of 22.25 to 22.75 MHz.

At this point, the selecting unit 202c7 selects and transmits either one of frequency signals of 22.25 and 22.75 MHz transmitted from the transmitting unit 202c6.

Describing in further detail, the selecting unit 202c7 includes a first switching unit 202c71, a second switching unit 202c72, and a transfer unit 202c73.

The first switching unit 202c71 initializes a selection signal TX input terminal by an enable signal EN.

Here, the first switching unit 202c71 includes a first switching element Q1 and a first resistor R1.

At this point, the first switching element Q1 contains at least one of a metal-oxide semiconductor field effect transistor (MOSFET), a bipolar junction transistor (BJT), an insulated gate bipolar transistor (IGBT), a gate turn-off (GTO) thyristor, and a MOS Controlled Thyristor (MCT) considering a switching loss rate at the time of performing a switching operation in order to lower power consumption by efficiently supplying a switch operating voltage when power is supplied.

The second switching unit 202c72 transfers a first voltage to a status signal CON input terminal when a selection signal TX is inputted through the selection signal TX input terminal and transfers a ground voltage to the status signal CON input terminal when a complementary signal of the selection signal TX is inputted through the selection signal TX input terminal.

Here, the second switching unit 202c72 includes a second switching element Q2 and a second resistor R2.

At this point, the second switching element Q2 contains at least one of a metal-oxide semiconductor field effect transistor (MOSFET), a bipolar junction transistor (BJT), an insulated gate bipolar transistor (IGBT), a gate turn-off (GTO) thyristor, and a MOS Controlled Thyristor (MCT) considering a switching loss rate at the time of performing a switching operation in order to lower power consumption by efficiently supplying a switch operating voltage when power is supplied.

The transfer unit 202c73 is activated by a complementary signal of the enable signal EN, transfers a frequency signal of 22.75 MHz among the frequency signal of a frequency band corresponding to the broadcasting signal to the first low-pass unit 202c8 described below when the first voltage VCC is inputted into the status signal CON input terminal, and transfers a frequency signal of 22.25 MHz among the frequency signal of a frequency band corresponding to the broadcasting signal to the first low-pass unit 202c8 when the ground voltage is inputted into the status signal CON input terminal.

In the selecting unit 202c7, if an enable signal EN of a high state is applied to the first switching unit 202c71, the first switching unit 202c71 is turned on, and the selection signal TX input terminal is discharged through the ground. Therefore, the selection signal TX input terminal is initialized, and the transfer unit 202c73 is not activated.

On the other hand, in the selecting unit 202c7, if an enable signal EN of a low state is applied to the first switching unit 202c71, the first switching unit 202c71 is turned off. Then, if a selection signal TX of a high state is inputted into the second switching unit 202c72, the second switching unit 202c72 is turned off, and the first voltage VCC is transferred to the status signal CON input terminal. If a selection signal TX of a low state is inputted into the second switching unit 202c72, the second switching unit 202c72 is turned on, and the ground voltage is transferred to the status signal CON input terminal.

At this point, the first resistor R1 is provided to transfer the enable signal EN to the first switching unit 202c71, and the second resistor R2 is provided to transfer the selection signal TX to the second switching unit 202c72. The third resistor R3 is provided to transfer the first voltage VCC to the status signal CON input terminal.

The first low-pass unit 202c8 passes a frequency signal having a frequency lower than a certain frequency among any one frequency signal selected and provided by the selecting unit 202c7 and transmits the passed frequency signal to the amplifying unit 202c1.

Here, the first low-pass unit 202c8 passes a signal having a frequency lower than a certain frequency (e.g., 28 MHz) among any one frequency signal selected and provided by the selecting unit 202c7 and maintains a maximum insertion loss in a band ranging 44.5 to 45.5 MHz to be within a range of 50 to 200 dB, and thus an effect of a second harmonic wave can be effectively reduced.

The first tuner 202d is provided inside the body 202a, receives the frequency signal corresponding to the broadcasting signal processed in accordance with a previously set frequency band and provided by the frequency signal processing unit 202c, converts the received frequency signal into a frequency signal corresponding to a broadcasting signal of another frequency band, and provides the converted frequency signal to the display panel 100.

At this point, the frequency signal corresponding to a broadcasting signal of another frequency band may be a digital intermediate frequency (DIF) signal.

The display apparatus 1000 according to a first embodiment of the invention described above can effectively reduce the cost and space required for installing cables needed to connect the first tuner 202d and the RF modem 202, and thus interior space of the display apparatus 1000 can be efficiently reduced.

Second and Third Embodiments

Figure 3:
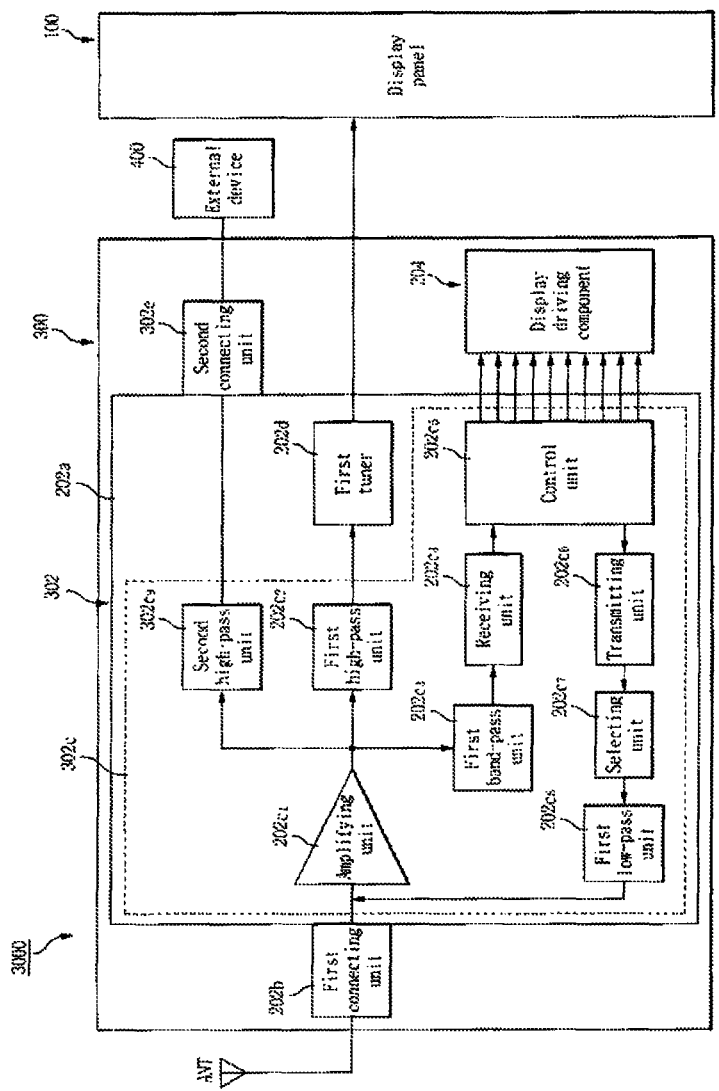
FIG. 3 is a block diagram showing the configuration of a display apparatus according to a second embodiment of the invention.
Figure 4:
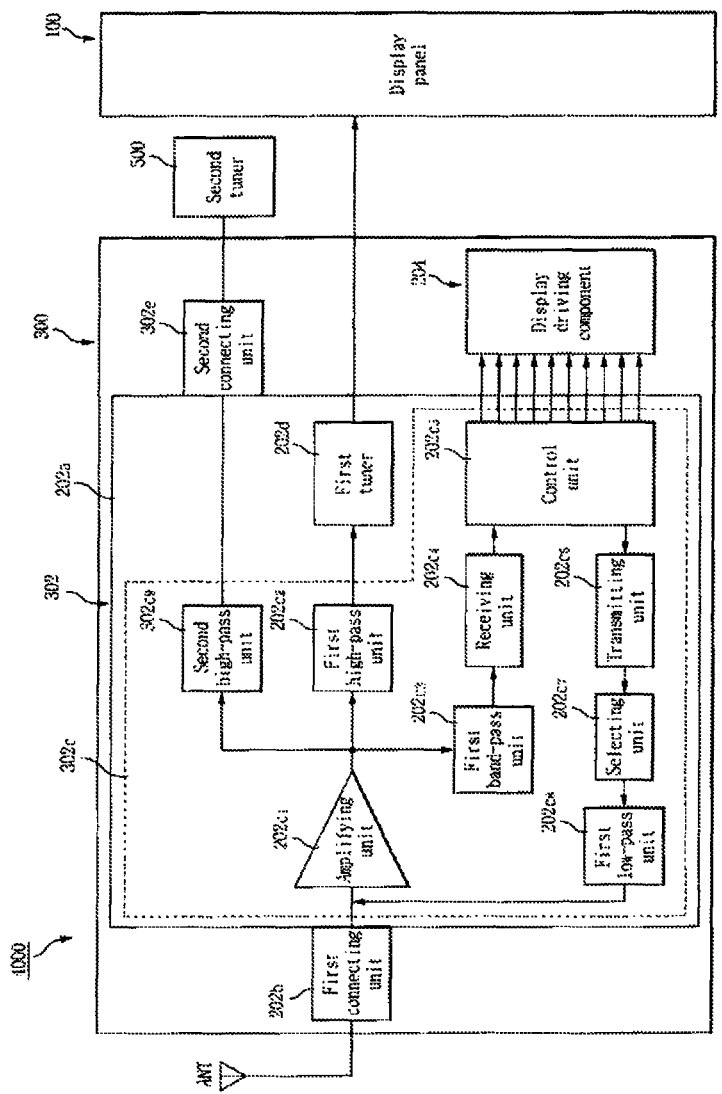
FIG. 4 is a block diagram showing the configuration of a display apparatus according to a third embodiment of the invention.

FIG. 3 is a block diagram showing the configuration of a display apparatus according to a second embodiment of the invention, and FIG. 4 is a block diagram showing the configuration of a display apparatus according to a third embodiment of present invention.

Referring to FIGS. 3 and 4, the display apparatus 3000 and 4000 according to the second and third embodiments of the invention includes a display panel 100, like the display apparatus 1000 according to the first embodiment of the invention.

An RF modem 302 provided in a display driving apparatus 300 of the display apparatus 3000 and 4000 according to the second and third embodiments of the invention includes a body 202a, a first connecting unit 202b, a frequency signal processing unit 302c, and a first tuner 202d, like the RF modem 202 provided in the display driving apparatus 200 of the display apparatus 1000 according to the first embodiment.

Since the functions of the constitutional components included in the display apparatus 3000 and 4000 according to the second and third embodiments of the invention and the close relationships among the components are the same as those of the constitutional components included in the display apparatus 1000 according to the first embodiment, details thereof will be omitted hereinafter.

The RF modem 302 of the display apparatus 3000 and 4000 according to the second and third embodiments of the invention further includes a second connecting assembly, a second high-pass unit 302c9, an external device 400, and a second tuner 500.

At this point, the second high-pass unit 302c9 passes a frequency signal having a frequency higher than a frequency corresponding to the amplified broadcasting signal among the frequency signal corresponding to the broadcasting signal amplified by the amplifying unit 202c1, and provides the passed frequency signal to the second connecting assembly.

That is, as shown in FIG. 3, the second connecting assembly is connected at the other side of the body 202a and electronically connected to at least one external device 400 provided outside of the RF modem 300.

In addition, the second high-pass unit 302c9 passes a frequency signal having a frequency higher than a frequency corresponding to the amplified broadcasting signal among the frequency signal corresponding to the broadcasting signal amplified by the amplifying unit 202c1 electrically connected to the first connecting unit 202b, and provides the passed frequency signal to the second connecting assembly.

The second connecting assembly provides the at least one external device 400 with the frequency signal provided by the frequency signal processing unit 302c to be provided to the at least one external device 400.

On the other hand, as shown in FIG. 4, the second connecting assembly 302e is connected at the other end of the body 202a and electronically connected to at least one second tuner 500 provided outside of the RF modem 300.

In addition, the second high-pass unit 302c9 passes a frequency signal having a frequency higher than a frequency corresponding to the amplified broadcasting signal among the frequency signal corresponding to the broadcasting signal amplified by the amplifying unit 202c1 electrically connected to the first connecting unit 202b, and provides the passed frequency signal to the second connecting assembly.

The second connecting assembly provides the at least one second tuner 500 with the frequency signal provided by the frequency signal processing unit 302c to be provided to the at least one second tuner 500.

The display apparatus 3000 and 4000 according to the second and third embodiments of the invention described above can effectively reduce the cost and space required for installing cables needed to connect the first tuner 202d and the RF modem 302, and thus interior space of the display apparatus 3000 and 4000 can be efficiently reduced.

In addition, the display apparatus 3000 and 4000 according to the second and third embodiments of the invention does not need an additional RF modem 302 when it connects to either the at least one external device 400 or the at least one second tuner 500, and thus manufacturing cost of the RF modem 302 can be reduced.

Fourth, Fifth, Sixth, Seventh, Eighth, Ninth, Tenth and Eleventh Embodiments

Figure 5:
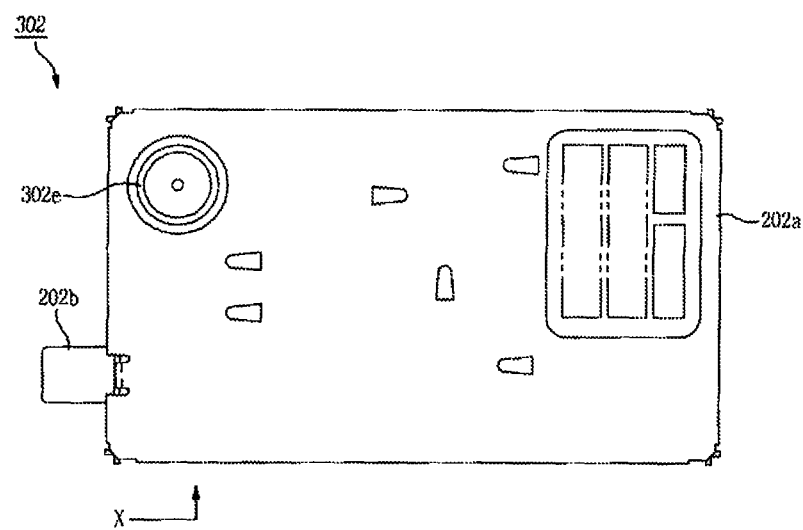
FIG. 5 is a plan view showing an RF modem according to a fourth embodiment of the invention.
Figure 6:
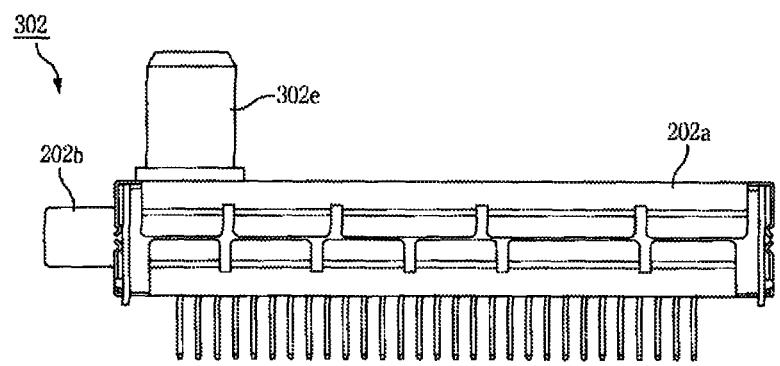
FIG. 6 is a front view showing an RF modem taken from position X in FIG. 5.

FIG. 5 is a plan view showing an RF modem according to a fourth embodiment of the invention, and FIG. 6 is a front view showing an RF modem taken from position X in FIG. 5.

Figure 7:
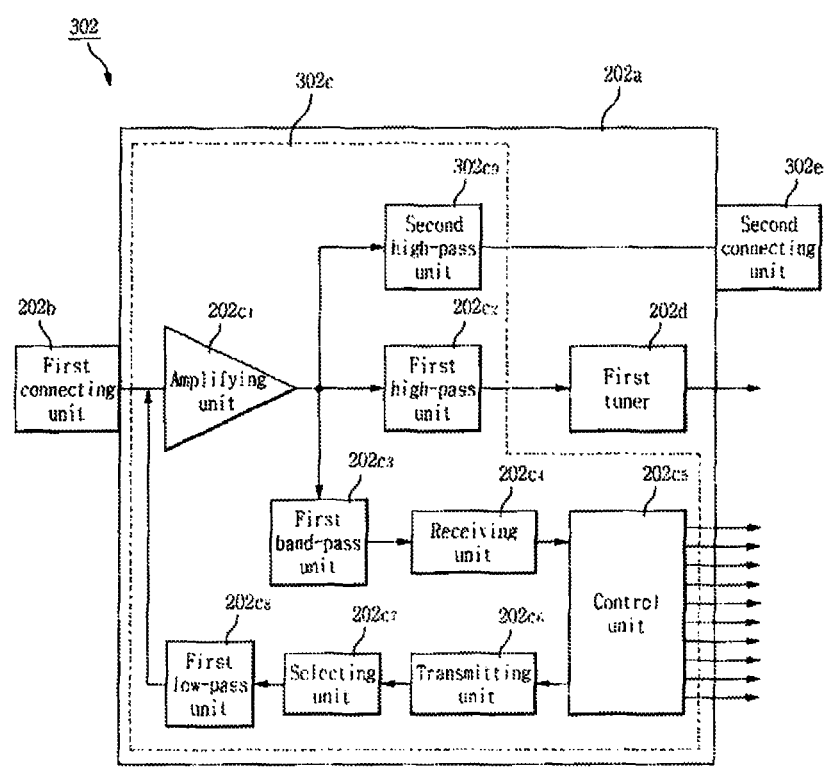
FIG. 7 is a block diagram showing the configuration of an RF modem according to a fourth embodiment of the invention.

FIG. 7 is a block diagram showing the configuration of an RF modem according to a fourth embodiment of the invention.

Referring to FIGS. 5 to 7, the RF modem 302 according to the fourth embodiment of the invention includes a first connecting unit 202b, a second connecting assembly, and a second high-pass unit 302c9, like the RF modem 302 according to the second and third embodiments.

Since the functions of the constitutional components included in the RF modem 302 according to the fourth embodiment of the invention and the close relationships among the components are the same as those of the constitutional components included in the RF modem 302 according to the second and third embodiments, details thereof will be omitted hereinafter.

Here, the second connecting assembly includes a second connecting unit 302e.

At this point, the first connecting unit 202b and the second connecting unit 302e are separate from each other outside the body 202a.

That is, the first connecting unit 202b may be provided at one outer end of the body 202a, and the second connecting unit 302e may be provided on the top of the body 202a.

Figure 8:
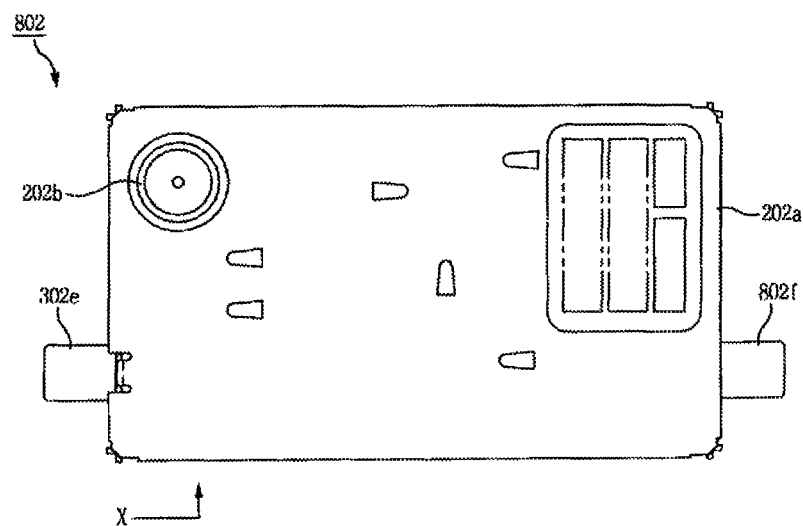
FIG. 8 is a plan view showing an RF modem according to a fifth embodiment of the invention.
Figure 9:
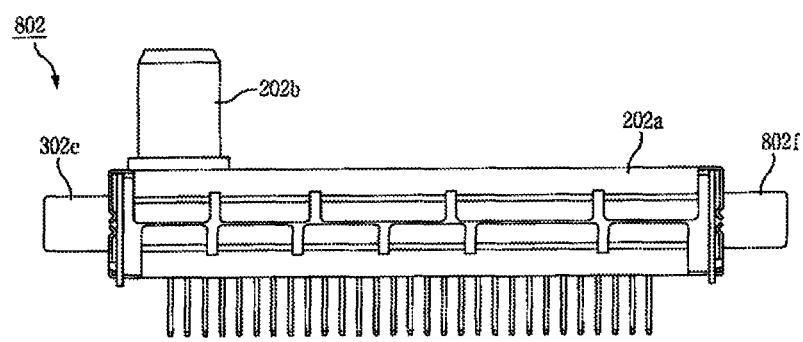
FIG. 9 is a front view showing an RF modem taken from position X in FIG. 8.

FIG. 8 is a plan view showing an RF modem according to a fifth embodiment of the invention, and FIG. 9 is a front view showing an RF modem taken from position X in FIG. 8.

Figure 10:
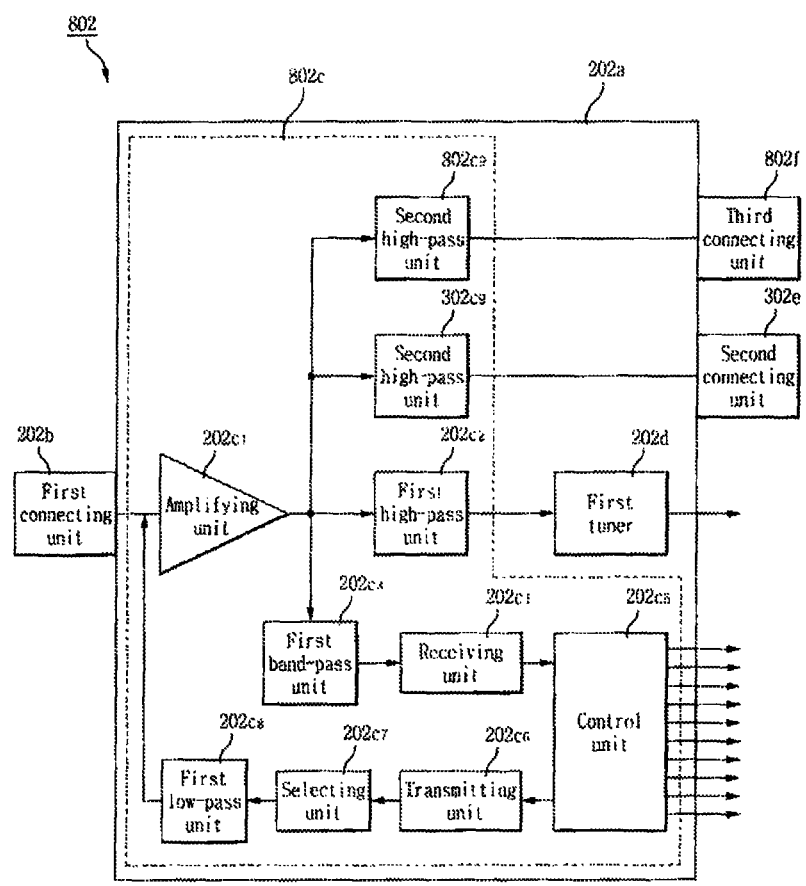
FIG. 10 is a block diagram showing the configuration of an RF modem according to a fifth embodiment of the invention.

FIG. 10 is a block diagram showing the configuration of an RF modem according to a fifth embodiment of the invention.

Referring to FIGS. 8 to 10, the RF modem 802 according to the fifth embodiment of the invention includes a first connecting unit 202b and a second high-pass unit 302c9, like the RF modem 302 according to the fourth embodiment.

Since the functions of the constitutional components included in the RF modem 802 according to the fifth embodiment of the invention and the close relationships among the components are the same as those of the constitutional components included in the RF modem 302 according to the fourth embodiment, details thereof will be omitted hereinafter.

The RF modem 802 according to the fifth embodiment of the invention further includes a frequency signal processing unit 802c containing a second high-pass unit 802c9, and a second connecting assembly containing a second connecting unit 302e and a third connecting unit 802f.

At this point, the first connecting unit 202b may be provided on the top of the body 202a, and the second connecting unit 302e may be provided at one outer end of the body 202a. The third connecting unit 802f may be provided at the other outer end of the body 202a.

Figure 11:
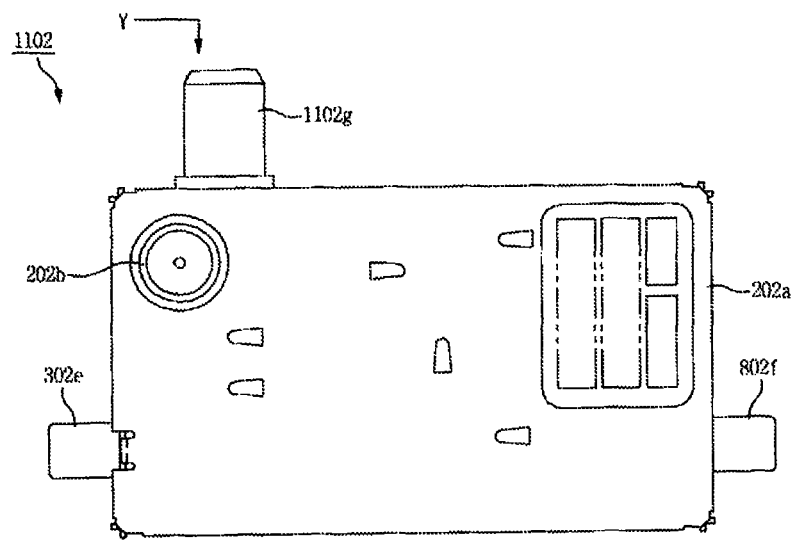
FIG. 11 is a plan view showing an RF modem according to a sixth embodiment of the invention.
Figure 12:
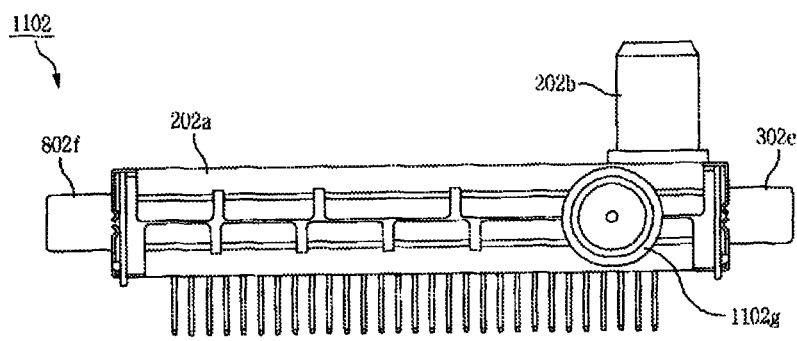
FIG. 12 is a front view showing an RF modem taken from position Y in FIG. 11.

FIG. 11 is a plan view showing an RF modem according to a sixth embodiment of the invention, and FIG. 12 is a front view showing an RF modem taken from position Y in FIG. 11.

Figure 13:
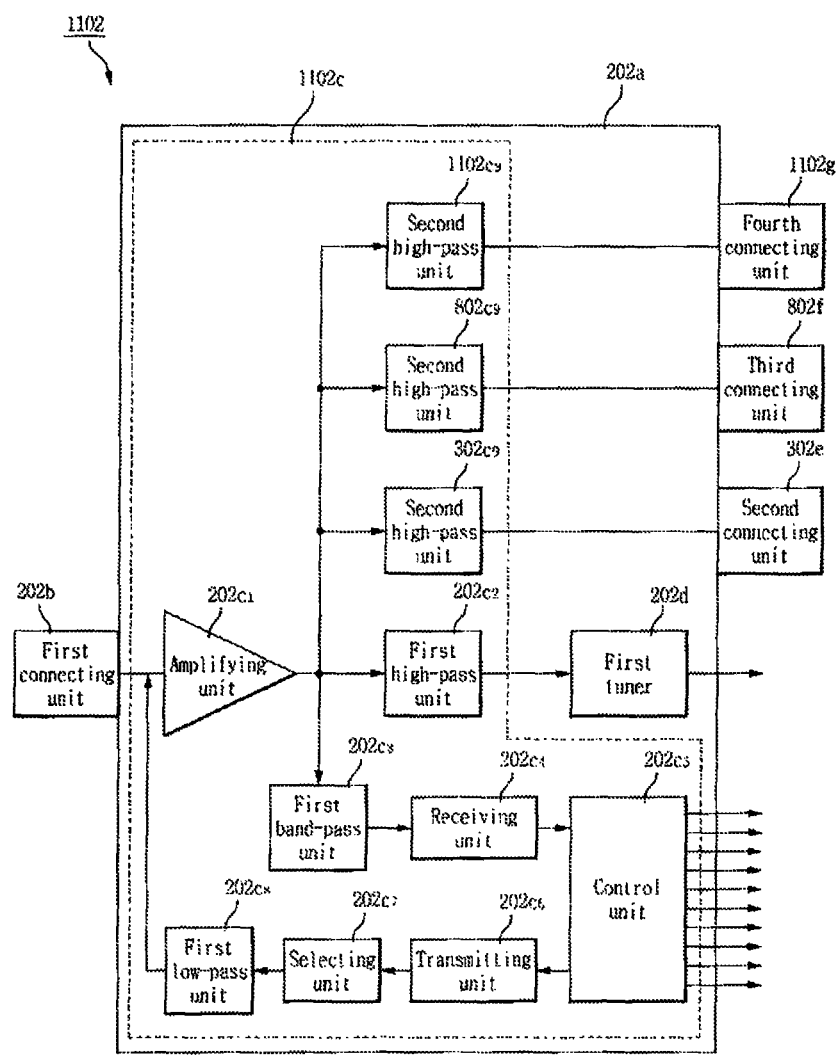
FIG. 13 is a block diagram showing the configuration of an RF modem according to a sixth embodiment of the invention.

FIG. 13 is a block diagram showing the configuration of an RF modem according to a sixth embodiment of the invention.

Referring to FIGS. 11 to 13, the RF modem 1102 according to the sixth embodiment of the invention includes a first connecting unit 202b and a second high-pass unit 302c9, like the RF modem 302 according to the fourth embodiment.

Since the functions of the constitutional components included in the RF modem 1102 according to the sixth embodiment of the invention and the close relationships among the components are the same as those of the constitutional components included in the RF modem 302 according to the fourth embodiment, details thereof will be omitted hereinafter.

The RF modem 1102 according to the sixth embodiment of the invention further includes a frequency signal processing unit 1102c containing second high-pass units 802c9 and 1102c9, and a second connecting assembly containing a second connecting unit 302e, a third connecting unit 802f, and a fourth connecting unit 1102g.

At this point, the first connecting unit 202b may be provided on the top of the body 202a, and the second connecting unit 302e may be provided at one outer side of the body 202a. The third connecting unit 802f may be provided at the other outer side of the body 202a, and the fourth connecting unit 1102g may be provided at one different outer side of the body 202a.

Figure 14:
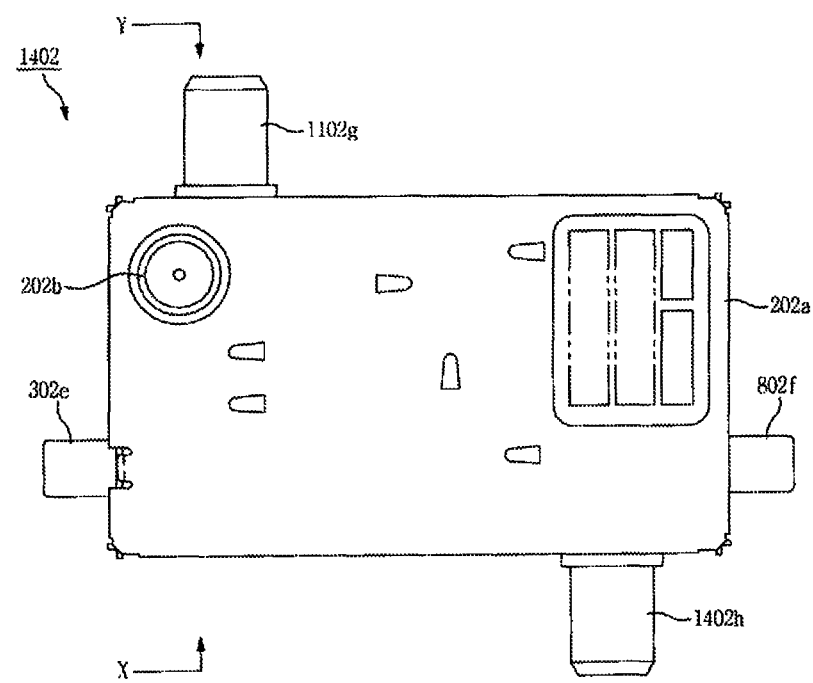
FIG. 14 is a plan view showing an RF modem according to a seventh embodiment of the invention.
Figure 15:
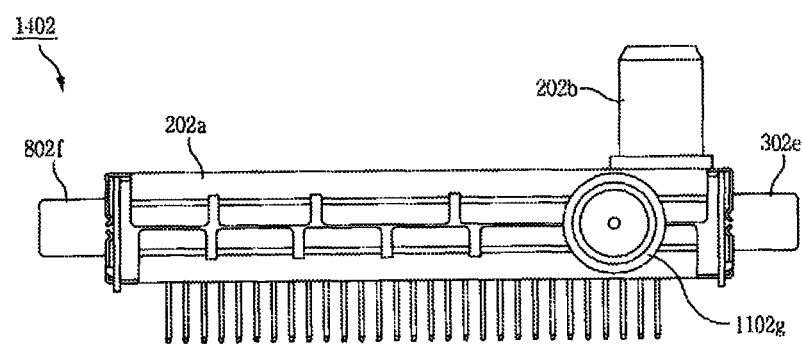
FIG. 15 is a front view showing an RF modem taken from position X in FIG. 14.

FIG. 14 is a plan view showing an RF modem according to a seventh embodiment of the invention, and FIG. 15 is a front view showing an RF modem taken from position X in FIG. 14.

Figure 16:
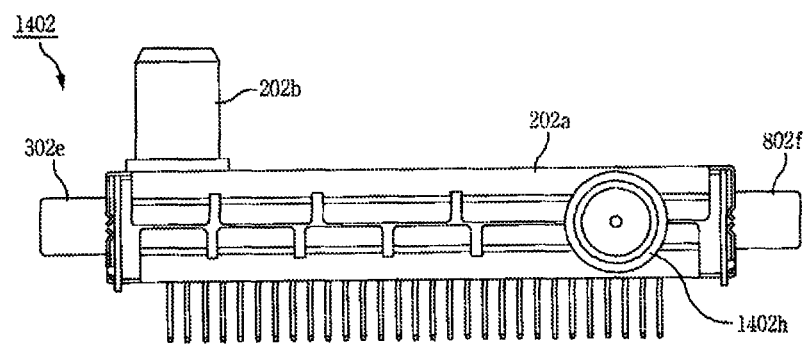
FIG. 16 is a front view showing an RF modem taken from position Y in FIG. 14.
Figure 17:
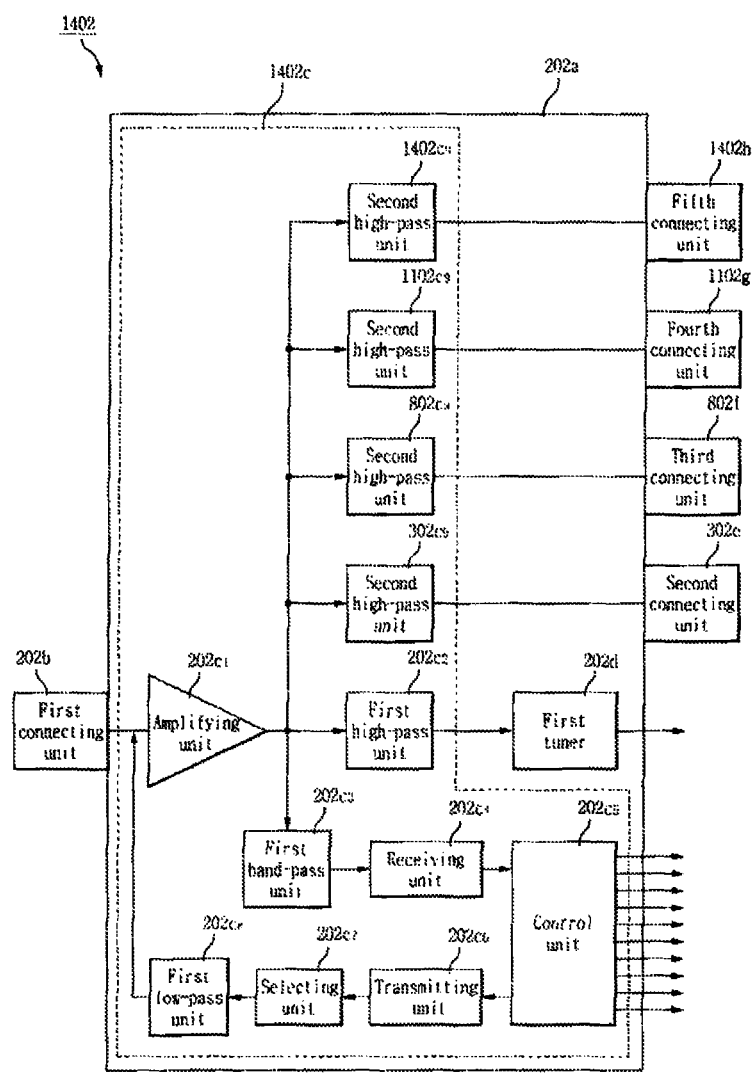
FIG. 17 is a block diagram showing the configuration of an RF modem according to a seventh embodiment of the invention.

FIG. 16 is a front view showing an RF modem taken from position Y in FIG. 14, and FIG. 17 is a block diagram showing the configuration of an RF modem according to a seventh embodiment of the invention.

Referring to FIGS. 14 to 17, the RF modem 1402 according to the seventh embodiment of the invention includes a first connecting unit 202b and a second high-pass unit 302c9, like the RF modem 302 according to the fourth embodiment.

Since the functions of the constitutional components included in the RF modem 1402 according to the seventh embodiment of the invention and the close relationships among the components are the same as those of the constitutional components included in the RF modem 302 according to the fourth embodiment, details thereof will be omitted hereinafter.

The RF modem 1402 according to the seventh embodiment of the invention further includes a frequency signal processing unit 1402c containing second high-pass units 802c9, 1102c9 and 1402c9, and a second connecting assembly containing a second connecting unit 302e, a third connecting unit 802f, a fourth connecting unit 1102g, and a fifth connecting unit 1402h.

At this point, the first connecting unit 202b may be provided on the top of the body 202a, and the second connecting unit 302e may be provided at one outer side of the body 202a. The third connecting unit 802f may be provided at the other outer side of the body 202a.

In addition, the fourth connecting unit 1102g may be provided at one different outer side of the body 202a, and the fifth connecting unit 1402h may be provided at the other different outer side of the body 202a.

Figure 18:
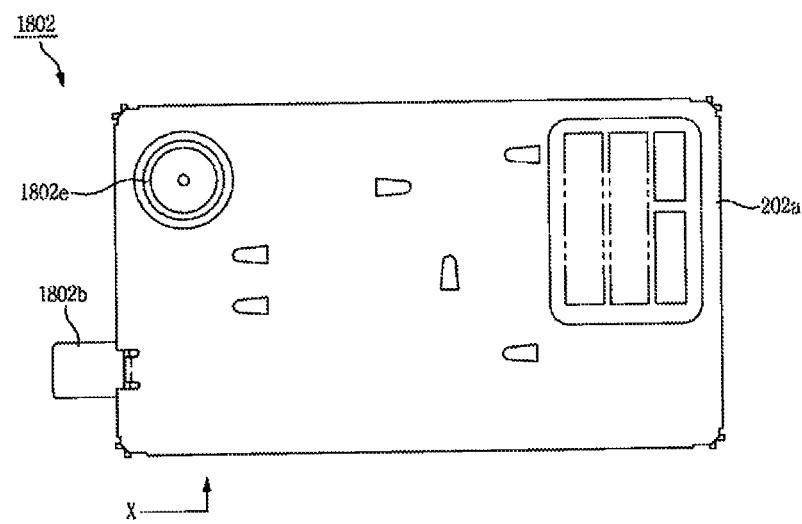
FIG. 18 is a plan view showing an RF modem according to an eighth embodiment of the invention.
Figure 19:
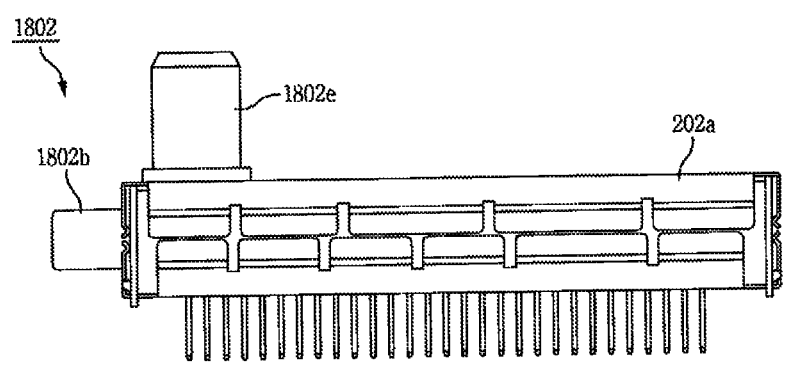
FIG. 19 is a front view showing an RF modem taken from position X in FIG. 18.

FIG. 18 is a plan view showing an RF modem according to an eighth embodiment of the invention, and FIG. 19 is a front view showing an RF modem taken from position X in FIG. 18.

Figure 20:
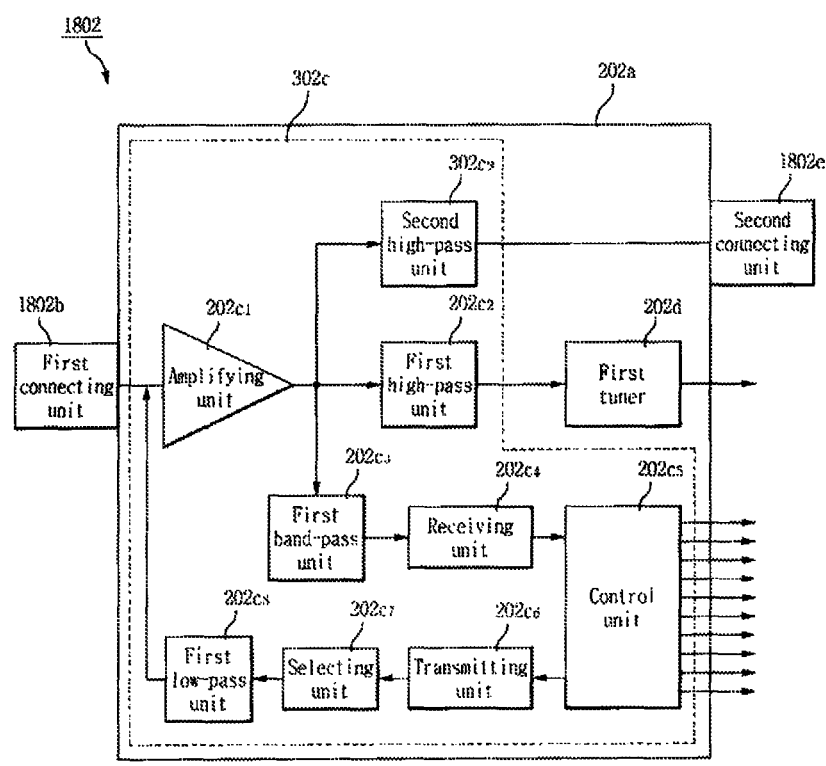
FIG. 20 is a block diagram showing the configuration of an RF modem according to an eighth embodiment of the invention.

FIG. 20 is a block diagram showing the configuration of an RF modem according to an eighth embodiment of the invention.

Referring to FIGS. 18 to 20, a body 202a, a first tuner 202d and a frequency signal processing unit 302c included in the RF modem 1802 according to the eighth embodiment of the invention are provided in the same manner as the body 202a, the first tuner 202d and the frequency signal processing unit 302c included in the RE modem 302 according to the second and third embodiments.

Since the functions of the constitutional components included in the RF modem 1802 according to the eighth embodiment of the invention and the close relationships among the components are the same as those of the constitutional components included in the RF modem 302 according to the second and third embodiments, details thereof will be omitted hereinafter.

The RF modem 1802 according to the eighth embodiment of the invention further includes a first connecting unit 1802b and a second connecting assembly containing a second connecting unit 1802e.

At this point, the first connecting unit 1802b may be provided at one outer side of the body 202a, and the second connecting unit 1802e may be provided on the top of the body 202a.

Figure 21:
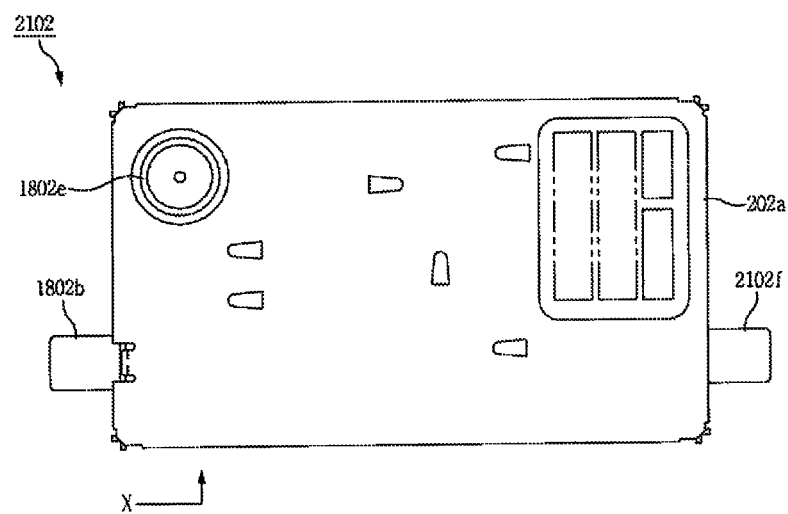
FIG. 21 is a plan view showing an RF modem according to a ninth embodiment of the invention.
Figure 22:
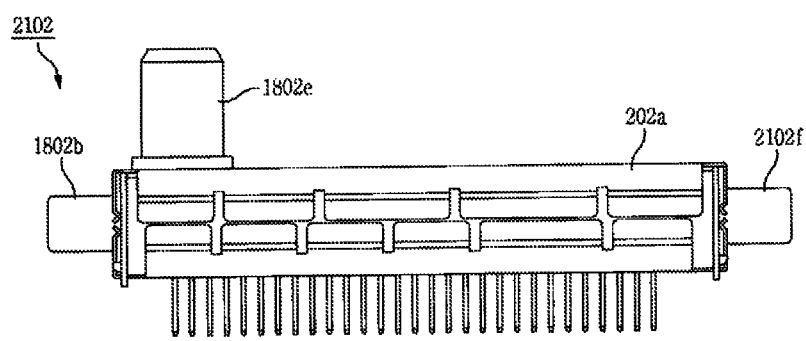
FIG. 22 is a front view showing an RF modem taken from position X in FIG. 21.

FIG. 21 is a plan view showing an RF modem according to a ninth embodiment of the invention, and FIG. 22 is a front view showing an RF modem taken from position X in FIG. 21.

Figure 23:
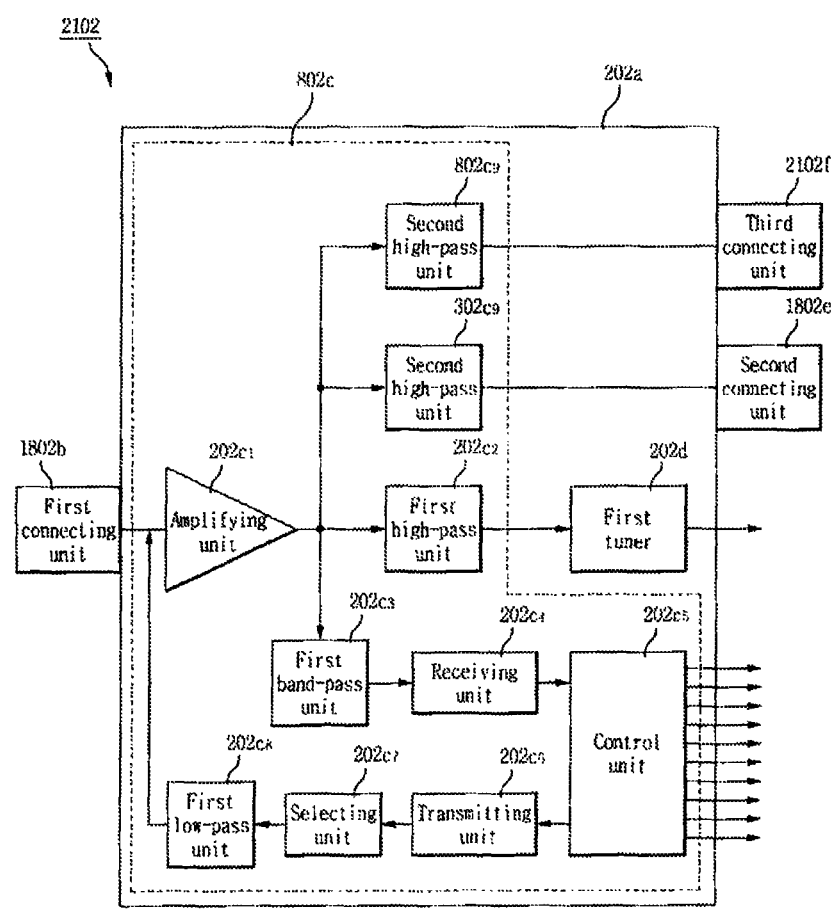
FIG. 23 is a block diagram showing the configuration of an RF modem according to a ninth embodiment of the invention.

FIG. 23 is a block diagram showing the configuration of an RF modem according to a ninth embodiment of the invention.

Referring to FIGS. 21 to 23, the RF modem 2102 according to the ninth embodiment of the invention includes a first connecting unit 1802b and a second high-pass unit 302c9, like the RF modem 1802 according to the eighth embodiment.

Since the functions of the constitutional components included in the RF modem 2102 according to the ninth embodiment of the invention and the close relationships among the components are the same as those of the constitutional components included in the RF modem 1802 according to the eighth embodiment, details thereof will be omitted hereinafter.

The RF modem 2102 according to the ninth embodiment of the invention further includes a frequency signal processing unit 802c containing a second high-pass unit 802c9, and a second connecting assembly containing a second connecting unit 1802c and a third connecting unit 2102f.

At this point, the first connecting unit 1802b may be provided at one outer end of the body 202a, and the second connecting unit 1802e may be provided on the top of the body 202a. The third connecting unit 2102f may be provided at the other outer end of the body 202a.

Figure 24:
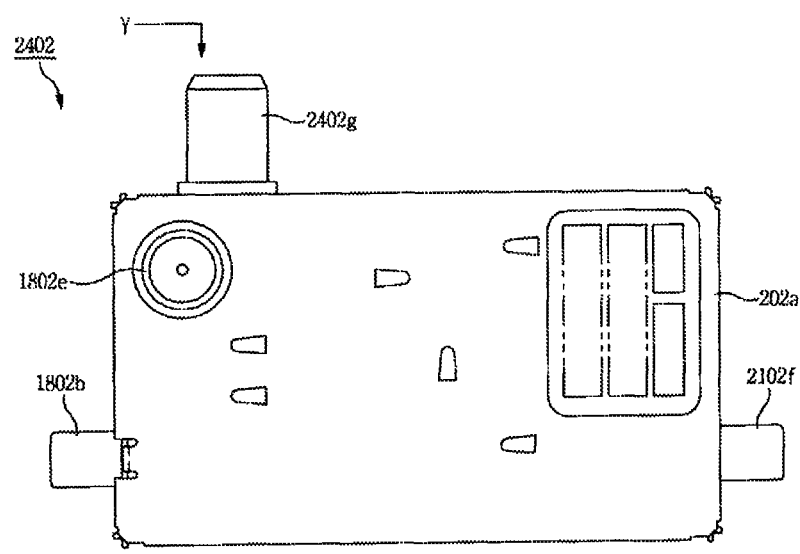
FIG. 24 is a plan view showing an RF modem according to a tenth embodiment of the invention.
Figure 25:
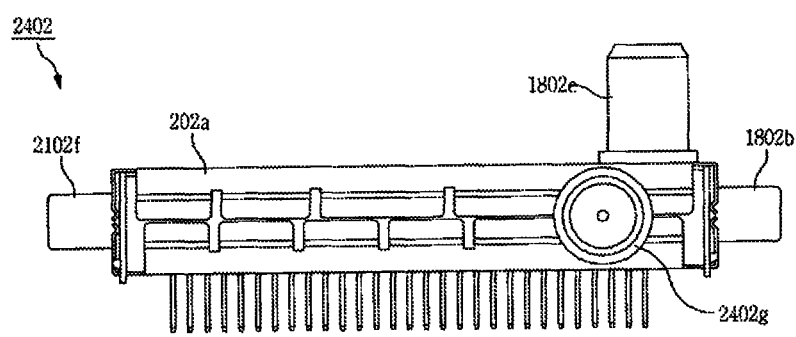
FIG. 25 is a front view showing an RF modem taken from position Y in FIG. 24.

FIG. 24 is a plan view showing an RF modem according to a tenth embodiment of the invention, and FIG. 25 is a front view showing an RF modem taken from position Y in FIG. 24.

Figure 26:
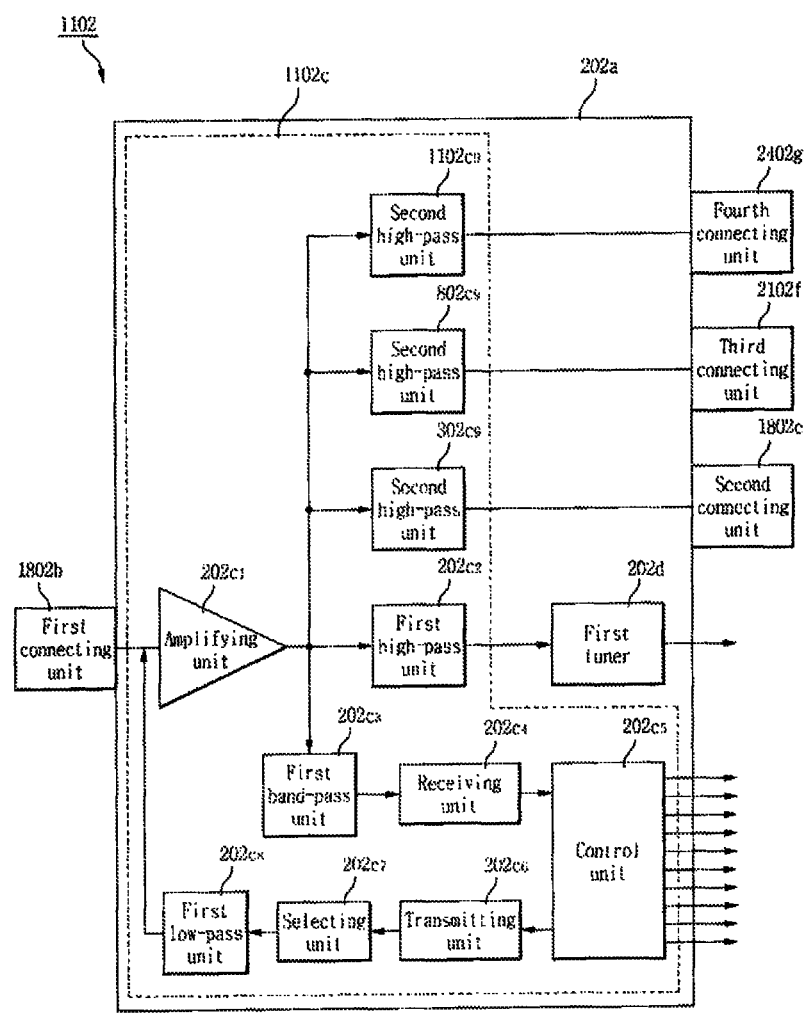
FIG. 26 is a block diagram showing the configuration of an RF modem according to a tenth embodiment of the invention.

FIG. 26 is a block diagram showing the configuration of an RF modem according to a tenth embodiment of the invention.

Referring to FIGS. 24 to 26, the RF modem 2402 according to the tenth embodiment of the invention includes a first connecting unit 1802b and a second high-pass unit 302c9, like the RF modem 2102 according to the ninth embodiment.

Since the functions of the constitutional components included in the RF modem 2402 according to the tenth embodiment of the invention and the close relationships among the components are the same as those of the constitutional components included in the RF modem 2102 according to the ninth embodiment, details thereof will be omitted hereinafter.

The RF modem 2402 according to the tenth embodiment of the invention further includes a frequency signal processing unit 1102c containing second high-pass units 802c9 and 1102c9, and a second connecting assembly containing a second connecting unit 1802e, a third connecting unit 2102f and a fourth connecting unit 2402g.

At this point, the first connecting unit 1802b may be provided at one outer end of the body 202a, and the second connecting unit 1802e may be provided on the top of the body 202a. The third connecting unit 2102f may be provided at the other outer end of the body 202a, and the fourth connecting unit 2402g may be provided at one different outer end of the body 202a.

Figure 27:
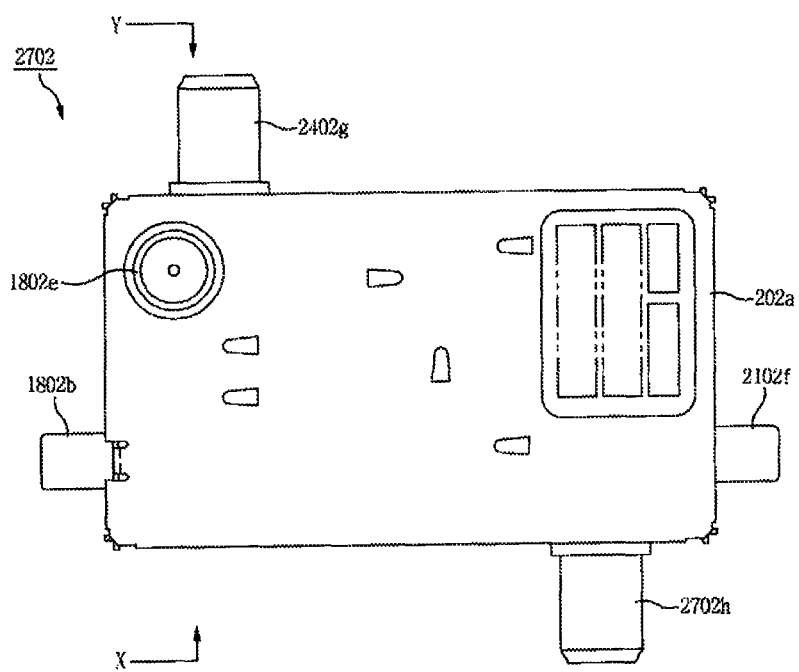
FIG. 27 is a plan view showing an RF modem according to an eleventh embodiment of the invention.
Figure 28:
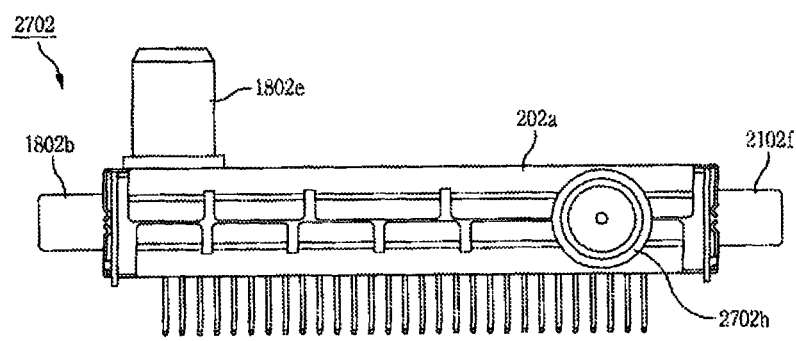
FIG. 28 is a front view showing an RF modem taken from position X in FIG. 27.

FIG. 27 is a plan view showing an RF modem according to an eleventh embodiment of the invention, and FIG. 28 is a front view showing an RF modem taken from position X in FIG. 27.

Figure 29:
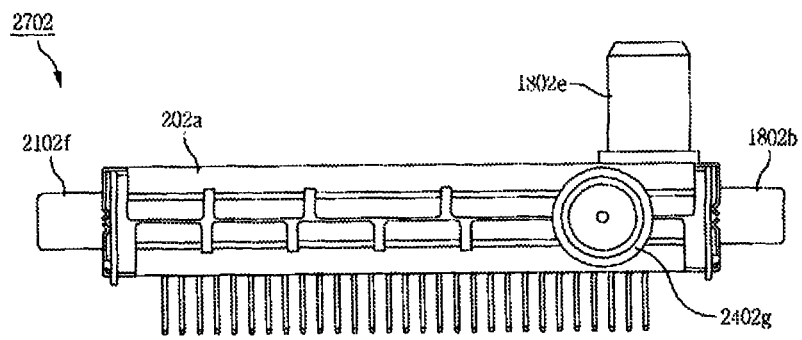
FIG. 29 is a front view showing an RF modem taken from position Y in FIG. 27.
Figure 30:
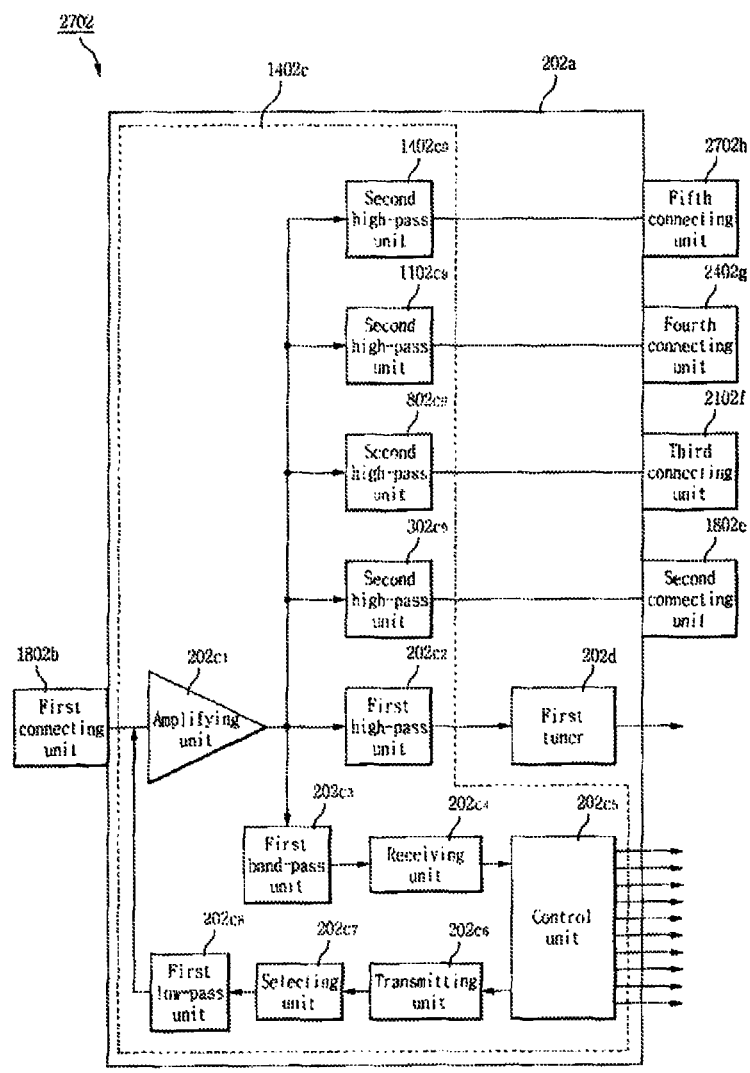
FIG. 30 is a block diagram showing the configuration of an RF modem according to an eleventh embodiment of the invention.

FIG. 29 is a front view showing an RF modem taken from position Y in FIG. 27, and FIG. 30 is a block diagram showing the configuration of an RF modem according to an eleventh embodiment of the invention.

Referring to FIGS. 27 to 30, the RF modem 2702 according to the eleventh embodiment of the invention includes a first connecting unit 1802b and a second high-pass unit 302c9, like the RF modem 2102 according to the ninth embodiment.

Since the functions of the constitutional components included in the RF modem 2702 according to the eleventh embodiment of the invention and the close relationships among the components are the same as those of the constitutional components included in the RF modem 2102 according to the ninth embodiment, details thereof will be omitted hereinafter.

The RF modem 2702 according to the eleventh embodiment of the invention further includes a frequency signal processing unit 1402c containing second high-pass units 802c9, 1102c9 and 1402c9, and a second connecting assembly containing a second connecting unit 1802e, a third connecting unit 2102f, a fourth connecting unit 2402g and a fifth connecting unit 2702h.

At this point, the first connecting unit 1802b may be provided at one outer side of the body 202a, and the second connecting unit 1802e may be provided on the top of the body 202a. The third connecting unit 2102f may be provided at the other outer side of the body 202a.

In addition, the fourth connecting unit 2402g may be provided at one different outer side of the body 202a, and the fifth connecting unit 2702h may be provided at the other different outer side of the body 202a.

The display apparatus including an RF modem 802, 1102, 1402, 1802, 2102, 2402 and 2702 according to the fourth to eleventh embodiments of the invention described above can effectively reduce the cost and space required for installing cables needed to connect the first tuner 202d and the RF modem 802, 1102, 1402, 1802, 2102, 2402 and 2702, like the display apparatuses including an RF modem 202 and 302 according to the first to third embodiments, and thus interior space of the display apparatus can be efficiently reduced.

In addition, the display apparatus including an RF modem 802, 1102, 1402, 1802, 2102, 2402 and 2702 according to the fifth to eleventh embodiments of the invention does not need an additional RF modem 802, 1102, 1402, 1802, 2102, 2402 and 2702 when it connects to at least two of two or more external devices 400 or second tuners 500, and thus manufacturing cost of the RF modem 802, 1102, 1402, 1802, 2102, 2402 and 2702 can be further reduced.

Figure 31:
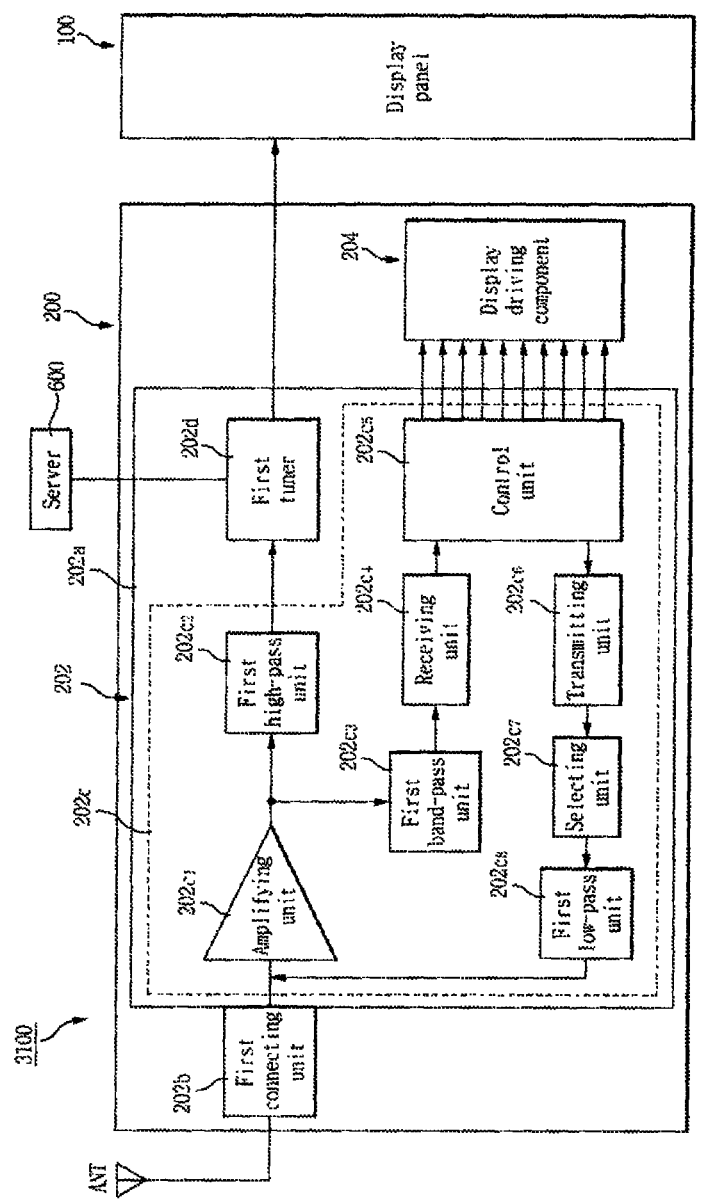
FIG. 31 is a block diagram showing the configuration of a display apparatus according to a twelfth embodiment of the invention.
Figure 32:
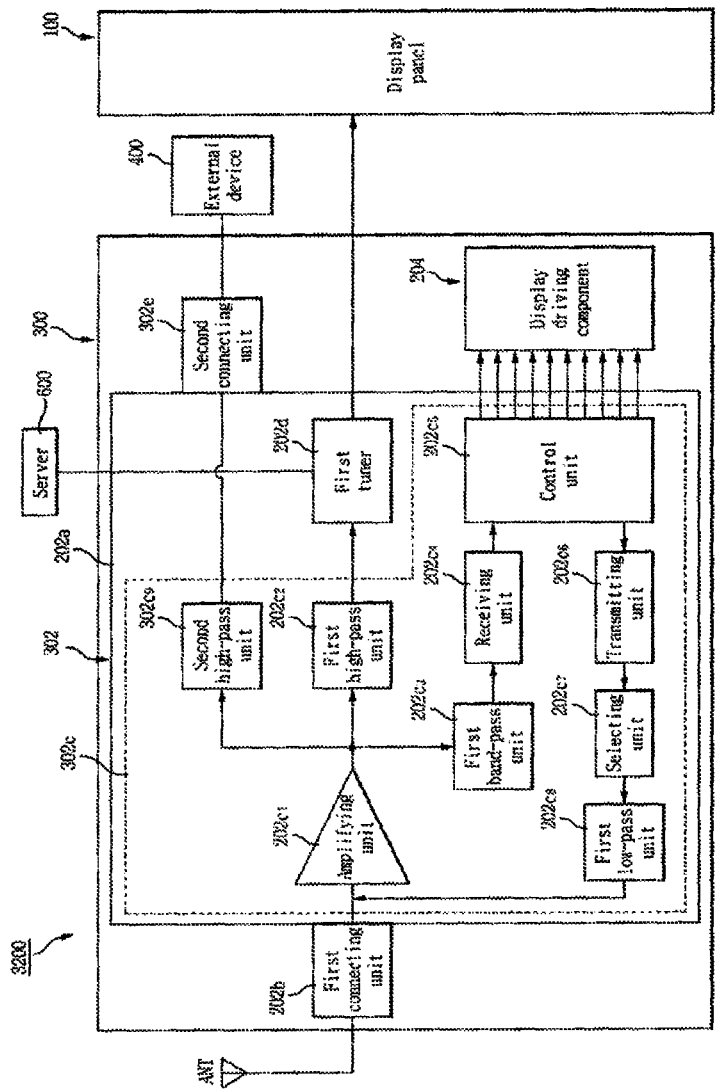
FIG. 32 is a block diagram showing the configuration of a display apparatus according to a thirteenth embodiment of the invention.

FIG. 31 is a block diagram showing the configuration of a display apparatus according to a twelfth embodiment of the invention, and FIG. 32 is a block diagram showing the configuration of a display apparatus according to a thirteenth embodiment of the invention.

Figure 33:
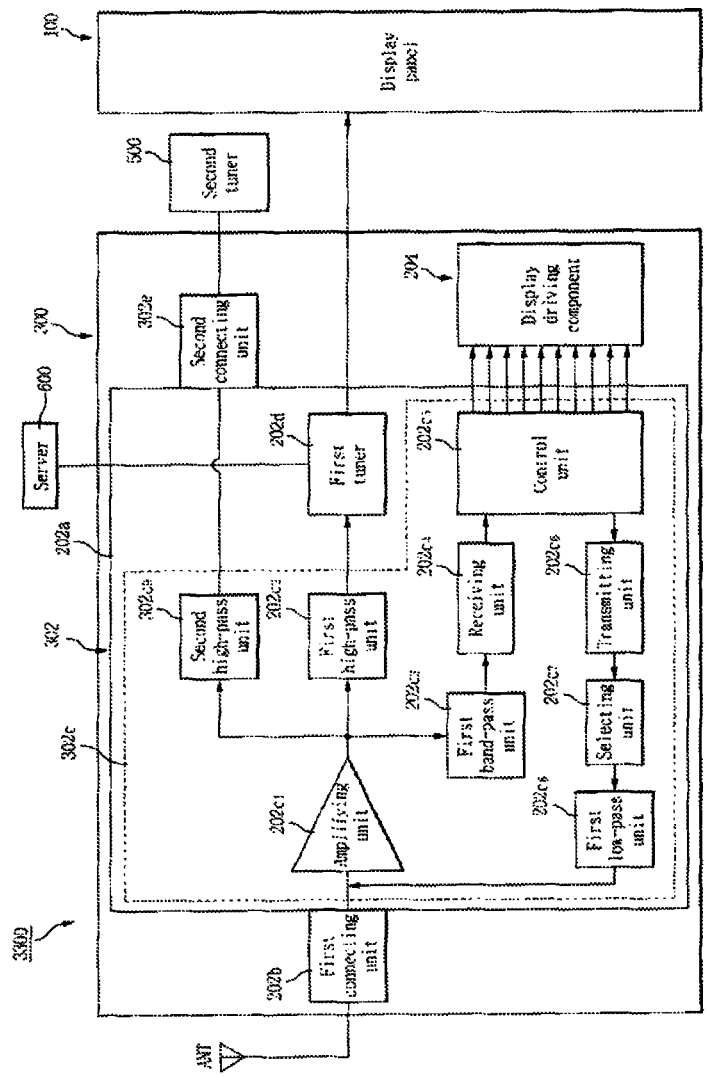
FIG. 33 is a block diagram showing the configuration of a display apparatus according to a fourteenth embodiment of the invention.
Figure 34:
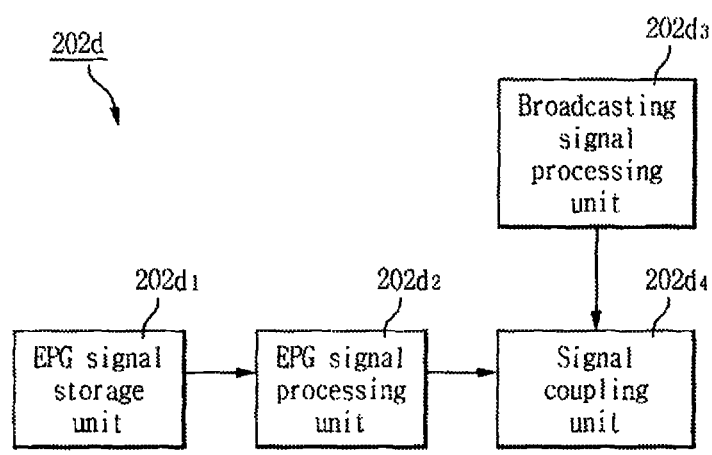
FIG. 34 is a block diagram showing the configuration of a tuner according to twelfth to fourteenth embodiments of the invention.

FIG. 33 is a block diagram showing the configuration of a display apparatus according to a fourteenth embodiment of the invention, and FIG. 34 is a block diagram showing the configuration of a tuner according to twelfth to fourteenth embodiments of the invention.

Referring to FIGS. 31 to 33, the display apparatus 3100, 3200 and 3300 according to the twelfth to fourteenth embodiments of the invention includes a display panel 100, a display driving apparatus 200 and 300, at least one external device 400, and at least one second tuner 500, like the display apparatus 1000, 3000 and 4000 according to the first to third embodiments.

Since the functions of the constitutional components included in the display apparatus 3100, 3200 and 3300 according to the twelfth to fourteenth embodiments of the invention and the close relationships among the components are the same as those of the constitutional components included in the display apparatus 1000, 3000 and 4000 according to the first to third embodiments, details thereof will be omitted hereinafter.

The display apparatus 3100, 3200 and 3300 according to the twelfth to fourteenth embodiments of the invention includes a first tuner 202d.

Here, the first tuner 202d is provided inside the body 202a and electrically connected to the display panel 100. The first tuner 202d receives a frequency signal corresponding to the broadcasting signal provided by the frequency signal processing unit 202c and 302c and converts the received frequency signal into a frequency signal corresponding to a broadcasting signal of a different frequency band.

At this point, in a standby mode, the first tuner 202d converts an EPG signal received from the server 600 provided outside of the display apparatus into an unassigned broadcasting channel and stores the converted EPG signal. In a normal mode, the first tuner 202d processes the stored EPG signal, converts the broadcasting signal into a broadcasting channel finally selected among assigned broadcasting channels, and processes the converted broadcasting signal.

Here, the display panel 100 includes an on screen display (OSD) module, and at least either broadcasting information corresponding to the broadcasting signal or EPG information corresponding to the EPG signal provided by the first tuner 202d can be displayed using the display panel 100 and the OSD module.

At this point, the EPG displays a program listing contained in the EPG information corresponding to the EPG signal on the display panel 100 so that a user may select a desired program using the OSD module (not shown), or the EPG allows the user to search for a desired program by selecting a time, a title, a channel, a genre and the like.

Here, the EPG information may include information on broadcasting programs for a day to a week and information on the broadcasting programs for at least one of fifteen days, a month and a year.

Describing in further detail, as shown in FIG. 34, the first tuner 202d includes an EPG signal storage unit 202d1, an EPG signal processing unit 202d2, a broadcasting signal processing unit 202d3, and a signal coupling unit 202d4.

In a standby mode, the EPG signal storage unit 202d1 converts the EPG signal provided by the server 600 into an unassigned broadcasting channel and stores the converted EPG signal.

At this point, the EPG signal storage unit 202d1 contains a microcomputer (Micom) and non-volatile memory (EEPROM).

The Micom receives and provides the EPG signal provided by the server 600, and the non-volatile memory (EEPROM) stores the EPG signal provided through the Micom.

In the normal mode, the EPG signal processing unit 202d2 processes the EPG signal stored in the EPG signal storage unit 202d1.

In the normal mode, the broadcasting signal processing unit 202d3 converts the broadcasting signal provided by the frequency signal processing unit 202c and 302c into a broadcasting channel finally selected among the assigned broadcasting channels and processes the converted broadcasting signal.

In the normal mode, the signal coupling unit 202d4 couples EPG data corresponding to the EPG signal processed by the EPG signal processing unit 202d2 with final broadcasting channel data corresponding to the broadcasting signal processed by the broadcasting signal processing unit 202d3.

At this point, the signal coupling unit 202d4 contains a multiplexer.

A method 3500 for driving the display apparatus 3100, 3200 and 3300 according to the twelfth to fourteenth embodiments of the invention will be described with reference to FIG. 35.

Figure 35:
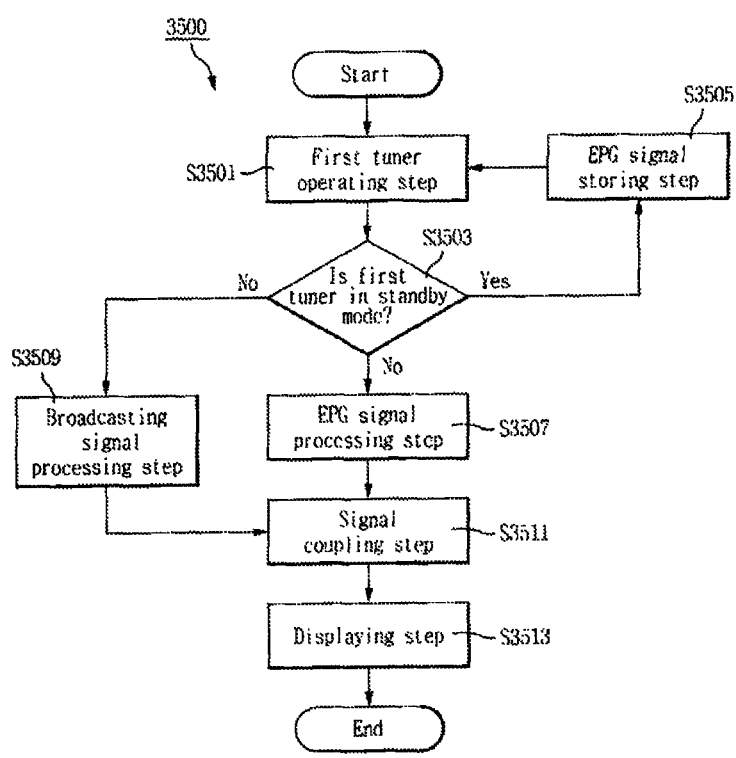
FIG. 35 is a flowchart illustrating a method for driving a display apparatus according to twelfth to fourteenth embodiments of the invention.

FIG. 35 is a flowchart illustrating a method for driving a display apparatus according to twelfth to fourteenth embodiments of the invention.

Referring to FIG. 35, the method 3500 for driving the display apparatus 3100, 3200 and 3300 according to the twelfth to fourteenth embodiments of the invention comprises a first tuner operating step S3501, a first tuner standby mode determining step S3503, an EPG signal storing step S3505, an EPG signal processing step S3507, a broadcasting signal processing step S3509, a signal coupling step S3511, and a displaying step S3513.

First, the method 3500 for driving the display apparatus 3100, 3200 and 3300 according to the twelfth to fourteenth embodiments of the invention performs the first tuner operating step S3501 for operating the first tuner (202d of FIGS. 31 to 34).

Next, the first tuner standby mode determining step S3503 is performed to determine whether or not the first tuner (202d of FIGS. 31 to 34) operating through the first tuner operating step S3501 is in a standby mode.

At this point, if the first tuner (202d of FIGS. 31 to 34) is determined to be in a standby mode through the first tuner standby mode determining step S3503, the EPG signal storing step S3505 is performed to convert the EPG signal provided by the server (600 of FIGS. 31 to 33) through the EPG signal storage unit (202d1 of FIG. 34) into an unassigned broadcasting channel and store the converted EPG signal.

On the other hand, if the first tuner (202d of FIGS. 31 to 34) is determined to be in a normal mode through the first tuner standby mode determining step S3503, the EPG signal processing step S3507 is performed to normally operate the first tuner (202d of FIGS. 31 to 34) through the first tuner operating step S3501 and process the EPG signal stored in the EPG signal storage unit (202d1 of FIG. 34) through the EPG signal processing unit (202d2 of FIG. 34).

In addition, if the first tuner (202d of FIGS. 31 to 34) is determined to be in a normal mode through the first tuner standby mode determining step S3503, the broadcasting signal processing step S3509 is performed to normally operate the first tuner (202d of FIGS. 31 to 34) through the first tuner operating step S3501, convert the broadcasting signal provided by the frequency signal processing unit (202c of FIGS. 31 and 302c of FIGS. 32 and 33) through the broadcasting signal processing unit (202d3 of FIG. 34) into a broadcasting channel finally selected among assigned broadcasting channels, and process the converted broadcasting signal.

Next, the signal coupling step S3511 is performed to couple the EPG signal processed by the EPG signal processing unit (202d2 of FIG. 34) through the EPG signal processing step S3507 with the broadcasting signal processed by the broadcasting signal processing unit (202d3 of FIG. 34) through the broadcasting signal processing step S3509.

Finally, the displaying step S3513 is performed to receive the EPG signal and the broadcasting signal coupled by the signal coupling unit (202d4 of FIG. 34) and display at least either EPG information corresponding to the EPG signal or broadcasting information corresponding to the broadcasting signal on the display panel (100 of FIGS. 31 to 33).

At this point, the displaying step S3513 performs a step of displaying at least either the broadcasting information corresponding to the broadcasting signal or the EPG information corresponding to the EPG signal provided by the first tuner (202d of FIGS. 31 to 34) using the display panel (100 of FIGS. 31 to 33) and the OSD module.

The display apparatus 3100, 3200 and 3300 according to the twelfth to fourteenth embodiments of the invention described above can effectively reduce the cost and space required for installing cables needed to connect the first tuner 202d and the RF modem 202 and 302, like the display apparatus including an RF modem 202, 302, 802, 1102, 1402, 1802, 2102, 2402 and 2702 according to the first to eleventh embodiments, and thus interior space of the display apparatus 3100, 3200 and 3300 can be efficiently reduced.

Furthermore, since the display apparatus 3100, 3200 and 3300 according to the twelfth to fourteenth embodiments of the invention can process broadcasting information corresponding to a broadcasting signal and EPG information corresponding to an EPG signal using one first tuner 202d, manufacturing cost of the first tuner 202d can be reduced, and thus manufacturing cost of the display apparatus 3100, 3200 and 3300 can be reduced.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:
1. A display apparatus comprising:
   a display panel; and
   a display driver configured to drive the display panel,
   wherein the display driver includes:
      a first connector configured to receive a first signal from an antenna, the first signal including a broadcasting signal in broadcasting frequency band and a control signal in prescribed frequency band lower than the broadcasting frequency band;
      a tuner configured to receive the broadcasting signal, the broadcasting signal including an electronic program guide (EPG) signal in one frequency band of the broadcasting frequency band, assign the EPG signal to a prescribed EPG channel in a standby mode, and tune to a channel in response to a user's input to provide a signal corresponding to the channel and the EPG channel to the display panel in a normal mode, wherein in the standby mode, the tuner converts an EPG signal provided by a server into an unassigned broadcasting channel and stores the converted EPG signal; and
      a frequency signal processor comprising:

a first high-pass unit configured to pass a frequency signal having a frequency higher than a frequency corresponding to the broadcasting signal received from the first connector and provide the broadcasting signal to the tuner;

a first band-pass unit configured to pass the control signal received from the first connector in a prescribed band;

a first converter configured to convert the control signal to control digital data; and a controller configured to provide the control digital data to a display driving component, wherein the broadcasting signal and the control signal are filtered from the first signal.

2. The display apparatus of claim 1, wherein the display driver further includes the display driving component configured to display data in the display panel according to the control digital data.

3. The display apparatus of claim 1, wherein the tuner and the frequency signal processor are provided in a body in the display driver.

4. The display apparatus of claim 3, wherein the first connector is connected at one side of the body.

5. The display apparatus of claim 1, wherein the first converter converts the control signal to the control digital data in a frequency shift keying (FSK) modulation.

6. The display apparatus of claim 1, wherein the frequency signal processor further comprises an amplifier configured to amplify the first signal.

7. The display apparatus of claim 1, wherein the controller is further configured to generate data from the display driving component in response to a user's selection.

8. The display apparatus of claim 7, wherein the frequency signal processor further comprises:

a second converter configured to convert the data from the display driving component to a second signal in two prescribed frequency bands; and a selector configured to select a signal in one frequency band of the two prescribed frequency bands.

9. The display apparatus of claim 8, wherein the second converter converts the data from the display driving component to a second signal in a frequency shift keying (FSK) demodulation.

10. The display apparatus of claim 8, wherein the frequency signal processor further comprises a third pass unit configured to pass the selected signal from the selector.

11. The display apparatus of claim 1, wherein the controller is further configured to communicate with the display driving component in at least one of an inter-IC (IIC) communication method and a universal asynchronous receiver/transmitter (UART) communication method.

12. The display apparatus of claim 1, wherein the first band-pass unit passes the control signal in the band ranging from 49.5 to 50.5 MHz.

13. The display apparatus of claim 10, wherein the third pass unit passes selected signal in the band ranging from 22.25 to 22.75 MHz.

14. The display apparatus of claim 1, wherein the tuner comprises:

a memory configured to store the EPG signal, the EPG signal being allocated in the EPG channel in the standby mode;

a EPG signal processor configured to process the EPG signal in response to the user's input in the normal mode;

a broadcasting signal processor configured to process the signal corresponding to the channel in response to the user's input in the normal mode; and a signal coupler configured to couple the processed EPG signal from the EPG signal processor and the processed signal from the broadcasting signal processor.

15. The display apparatus of claim 4, wherein the display driver further includes at least one second connector connected at the other side of the body and configured to provide the broadcast signal to at least one outside device.

16. The display apparatus of claim 15, wherein the display driver further includes a fourth pass unit arranged between the first connector and the second connector and configured to pass the broadcasting signal.

* * * * *